United States Patent Office 3,472,766
Patented Oct. 14, 1969

3,472,766
SEPARATORY PROCESS UTILIZING A PERMEABLE POLYAMIDE MEMBRANE HAVING POLY (OXYETHYLENE) GRAFTS
Shlomo Rosenbaum, Berkeley, Calif., assignor to The Dow Chemical Company, Midland, Mich., a corporation of Delaware
No Drawing. Filed Jan. 10, 1968, Ser. No. 696,704
Int. Cl. B01d 13/00
U.S. Cl. 210—22          5 Claims

ABSTRACT OF THE DISCLOSURE

Permeable membranes comprising polyamides having non-randomly substituted poly(oxyethylene) grafts are useful in osmotic and dialytic separatory processes. Membranes having from 40 to 65 percent by weight of combined ethylene oxide are useful for processes requiring selective permeation of low molecular weight components such as urea and salt and/or water, and membranes with a lower amount of combined ethylene oxide are useful in reverse osmosis.

BACKGROUND OF THE INVENTION

This invention relates to osmotic and dialytic separatory processes utilizing permeable membranes. More particularly the process of this invention utilizes polyamide membranes having non-randomly substituted poly(oxyethylene) grafts.

Stimulated by such goals as desalination of sea water or brackish water, synethetic kidneys, etc. a great deal of research has been applied to improving permeable membranes or seeking new polymeric materials. As a result more permeable membranes have been made by after treatments such as stretching of wet membranes or swelling and annealing films at elevated temperatures; or by extraction of compounds to form networks in the films; or by chemical reactions to alter the physical characteristics of membrane materials. Additionaly, it has been shown more recently that membranes prepared in the form of very fine, hollow fibers greatly improve the efficiency of permeable separatory devices and are of particular advantage in such processes as reverse osmosis (ultra-filtration).

Extra corporeal hemodialysis research requires membranes capable of separating solutes from such complex mixtures as blood and new synthetic polymer membranes have been prepared such as the block copolymers of polyoxyethylene glycol and polyethylene terephthalate reported by D. J. Lyman et al. in Biochemistry 3, 985 (1964). Of interest to this research is to increase the permeability of the membrane to urea, salts, etc.

SUMMARY OF THE INVENTION

Accordingly this invention provides a separatory process having improved permeation rates for low molecular weight solutes such as urea and salts. The improved process utilizes a permeable polyamide membrane having non-randomly substituted poly(oxyethylene) grafts wherein the membrane contains from about 40 to about 65 percent by weight of combined ethylene oxide. The invention further contemplates reverse osmosis separations, particularly with membranes containing from about 10 to 40 percent by weight of combined ethylene oxide. The separatory process comprises exposing under a fluid pressure one side of a selectively permeable membrane to a fluid having at least one component permeable through the membrane and then collecting the portion which permeate the membrane. Fluid pressure is meant to include osmotic pressure, hydrostatic pressure, additional applied pressure above atmospheric pressure and the like.

DETAILED DESCRIPTION

The permeable membranes of this invention are prepared from a polymeric material having a group reactive to ethylene oxide such as an >NH group. Of particular interest are the polyamide or nylon type polymers, as well as the polyureas and polyurethanes. The polyamides are generally prepared by reacting a diamine with a dicarboxylic acid or by condensation of an amino carboxylic acid. The polyureas are generally prepared by reaction of a diamine with a diisocyanate and the polyurethanes by reaction of a diisocyanate with a glycol.

The permeable membrane, itself, is prepared by reacting the solid polymeric material with ethylene oxide to produce non-randomly substituted poly(oxyethylene) grafts according to the procedure described in "Hydroxyethyl Nylon, a New Flexible Super Polyamide Derivative" by H. C. Haas et al., J. Polymer Sci. 15, 427 (1955). While the research described by Haas, et al. was aimed at producing polymers having flexibility over a wide temperature range it has now been found that such polymers containing from about 10 to about 65 percent by weight of combined ethylene oxide possess useful permeability properties.

Polyamide materials include the common nylon polymers such as polycaprolactam (6 nylon), nylon 6–6 (hexamethylene diamine condensed with adipic acid), nylon 6–10, nylon 11, and the like as described, for example, in "Textbook of Polymer Science" F. W. Billmeyer, Jr., Interscience Publishers, New York, 1962 on pages 429–434 and in "Fibers from Synthetic Polymers" R. Hill, Elsevier, 1953, the chapters authored by R. J. W. Reynolds.

In general the polymeric material may be ethoxylated by treatment of the solid polymer (ground, powdered, pellets, etc.) with excess ethylene oxide for varying periods of time of a few hours up to 40 hours and longer in a stainless steel bomb heated in an oil bath thermostated to about 80° C. Usually, the longer the reaction time the greater the combined ethylene oxide content of the polymer. After heating, the bomb is cooled, opened and excess ethylene oxide evaporated.

The ethoxylated polymeric materials may be fabricated into a hollow fiber, film, etc. depending upon the type of apparatus. While the invention is not dependent on the physical shape of the polymeric permeable membrane, a hollow fiber is preferred. The membrane thickness ranges from about 2 to 300 mils with the membrane preferably being as thin as possible.

All manner of osmotic and dialytic processes may be performed with the permeable membrane of this invention. As the percent of combined ethylene oxide increases the permeability of the membrane to low molecular weight solutes is enhanced. It is preferred to utilize a membrane containing from about 40 to about 65 percent by weight of combined ethyelne oxide for high permeability for hydrophilic solutes, said membrane having particular interest to the field of extracorporeal hemodialysis. For separations such as reverse osmosis or ultra filtration, it is preferred to utilize a membrane containing from about 10 to about 40 percent by weight of combined ethylene oxide.

For purposes of illustrating the present invention, the following non-limiting examples are presented.

Example 1

A 10 gm. sample of a commercial nylon 6–6 (available as Zytel 42 from E. I. du Pont) was ground to pass a 20 mesh screen and then heated at 80° C. for 40 hours with 60 ml. of liquid ethylene oxide in a Parr bomb. After cooling the excess ethylene oxide was allowed to evaporate and the remaining material washed several times with water in a Waring Blendor before drying over molecular sieves at 40° C./0.1 mm. The polymeric product was granular, rubbery, and contained about 55 percent by weight of combined ethylene oxide by elemental analysis. Product yield was 21.6 gms.

A film was fabricated from the polyethoxylated graft nylon 6–6 prepared above by melt pressing 0.4 gm. for 5 minutes at 225–230° C. under 333 p.s.i. pressure, followed by cooling to 25° C. under pressure. The resultant film was 2.5–3 mils in thickness and had an area of 9.6 sq. inches.

The permeability of the polyethoxylated graft nylon 6–6 to hydrophilic solutes was tested by measuring the rate of dialysis of sodium chloride and urea. A permeability cell having the membrane (film) clamped to the bottom was immersed in a water bath maintained at 37° C. The membrane had an area of 20 sq. cm. The solution containing the dissolved solute was placed in the cell and the contents of the cell stirred during the dialysis experiment. The concentration of the solute was periodically determined and the reciprocal permeability (resistance to permeation) was expressed as the time in minutes required for the concentration of the solute in the cell to fall to one-half its original value (t. ½). All valves are corrected to a 1 mil membrane thickness.

Sodium chloride was determined by a conductometric titration for chloride. Urea was determined by the method of Walt and Crisp. Anal. Chem. 26, 452 (1954) which is based on the yellow-green color produced when p-dimethylaminobenzaldehyde is added to urea in HCl solution.

Comparative tests were made to an uncoated commercial cellophane membrane with the following results:

| Membrane | t.½, minutes | |
| --- | --- | --- |
| | NaCl | Urea |
| Cellophane | 16 | 76 |
| Ethoxylated nylon 6–6 | 13 | 36 |
| Nylon 6–6 | (1) | (1) |

1 Too slow to measure.

Example 2

Following the procedure of Example 1 a polyethoxylated graft polymer containing about 10 percent by weight of combined ethylene oxide was prepared by reacting the nylon 6–6 with ethylene oxide for 7 hours instead of 40 hours. The resultant membrane was impermeable to salt and urea using the previous dialysis apparatus. However, in a reverse osmosis test with a 3.5% by wt. solution of NaCl, 0.001 ml./hr./sq. cm. of water permeated the membrane (0.043 inch in thickness) under a pressure differential of 700 p.s.i. with a salt rejection of 85%.

What is claimed is:

1. A separatory process which comprises (a) exposing under fluid pressure one side of a selectively permeable membrane to a fluid having at least one component permeable through said membrane and (b) collecting that portion of the fluid which permeates the membrane; said membrane comprising a polymeric material modified by reaction of the solid material with ethylene oxide to contain from about 10 to about 65 percent by weight of ethylene oxide generally in the form of non-randomly substituted poly(oxyethylene) grafts wherein the polymeric material is selected from the group consisting of polyamide, polyurea and polyurethane.

2. The process of claim 1 wherein said membrane is a hollow fiber.

3. The process of claim 1 wherein the membrane has high permeability to low molecular weight components and contains from about 40 to about 65 percent by weight of combined ethylene oxide.

4. A reverse osmotic process according to the process of claim 1 wherein the membrane contains from about 10 to about 40 percent by weight of combined ethylene oxide.

5. The process of claim 1 wherein the polymeric material modified by reaction with ethylene oxide is a polyamide.

References Cited

UNITED STATES PATENTS 3,276,996  10/1966  Lazare _____ 210—22
3,423,491  1/1969  McLain et al. _____ 210—500 X REUBEN FRIEDMAN, Primary Examiner FRANK A. SPEAR, Jr., Assistant Examiner U.S. Cl. X.R.

210—23, 321, 500